United States Patent [19]

Robinson

[11] 3,925,622

[45] Dec. 9, 1975

[54] TELEPHONE APPARATUS

[75] Inventor: Stephen Perrin Robinson, Camberley, England

[73] Assignee: Ansafone Limited, England

[22] Filed: Feb. 14, 1974

[21] Appl. No.: 442,607

[30] Foreign Application Priority Data

Feb. 16, 1973 United Kingdom................. 7783/73

[52] U.S. Cl. .............. 179/18 BE; 179/5 P; 179/6 R

[51] Int. Cl.$^2$........................................... H04M 3/42

[58] Field of Search ....... 179/18 BE, 6 RT, 5 R, 5 P

[56] References Cited

UNITED STATES PATENTS 3,427,403 2/1969 Stokes et al......................... 179/5 R 3,510,598 5/1970 Ballin et al...................... 179/18 BE 3,591,727 7/1971 Shaw............................. 179/18 BE

*Primary Examiner*—William C. Cooper

*Attorney, Agent, or Firm*—Toren, McGeady and Stanger

[57] ABSTRACT

A telephone apparatus which includes means for automatically dialling a predetermined telephone number, means for verifying a coded response to the automatically dialled call, and means for inhibiting further automatic dialling to that predetermined number in the absence of a correctly coded response to the call.

6 Claims, 3 Drawing Figures

CALL DIVERTER

CALL DIVERTER

TELEPHONE APPARATUS

This invention relates to telephone apparatus and is concerned, more particularly, with such apparatus of the type which includes means for originating a telephone call to a predetermined number with the aid of automatic dialling equipment.

Where the predetermined number is well-recognised, such as for an emergency service, apparatus of the above type has been found to work well, but if the facility is extended to the use of private telephone numbers which may be changed day by day at the discretion of the subscriber using the apparatus then nuisance can arise, for example, in the form of repeated dialling of an incorrect number to the annoyance of that subscriber.

It is an object of the present invention to provide an improved telephone apparatus in which the above disadvantage is eliminated.

The present invention consists in telephone apparatus which includes means for automatically dialling a predetermined telephone number, means for verifying a coded response to the automatically dialled call, and means for inhibiting further automatic dialling to that predetermined number in the absence of a correctly coded response to the call.

Figure 1:
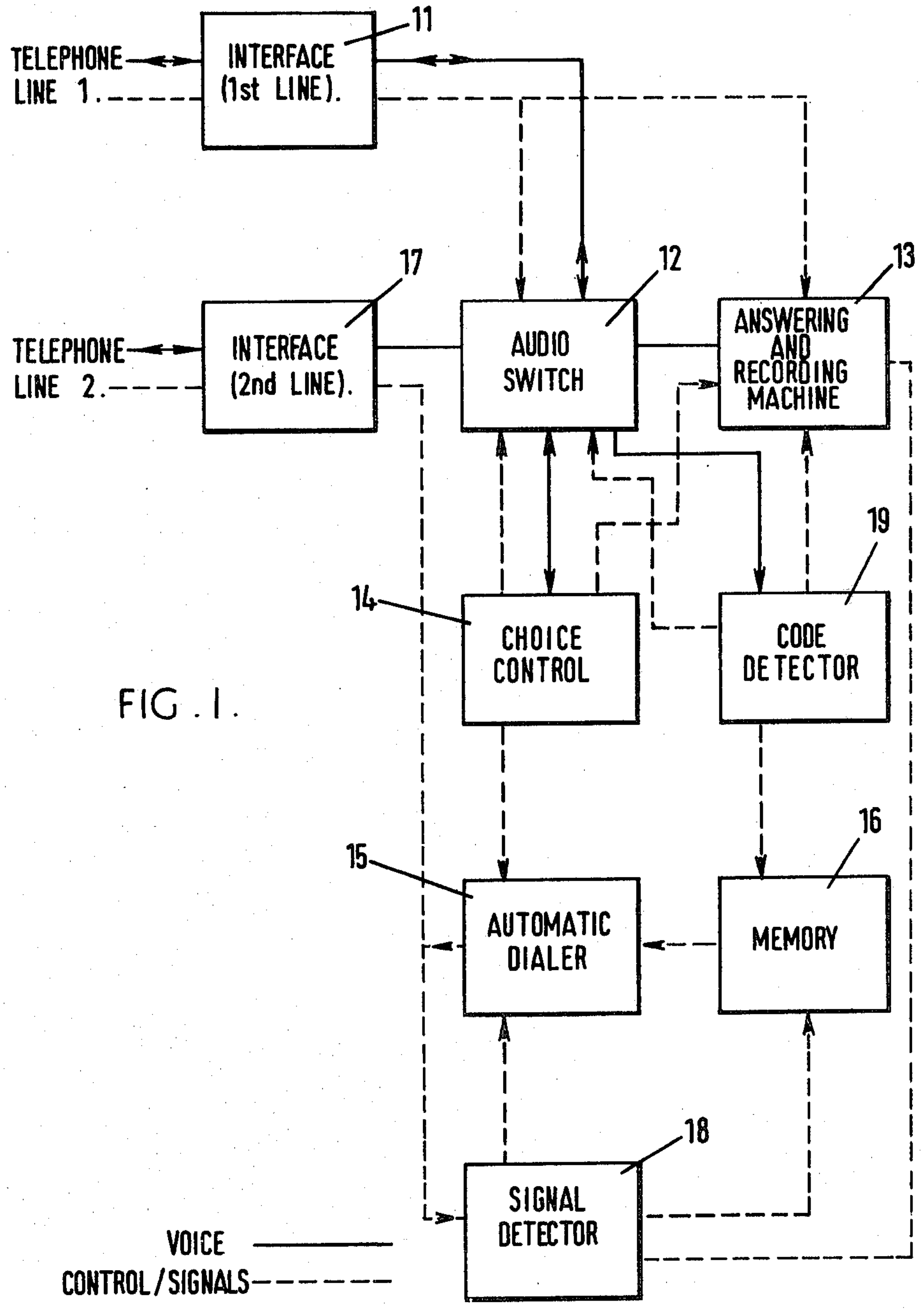
Figure 2:
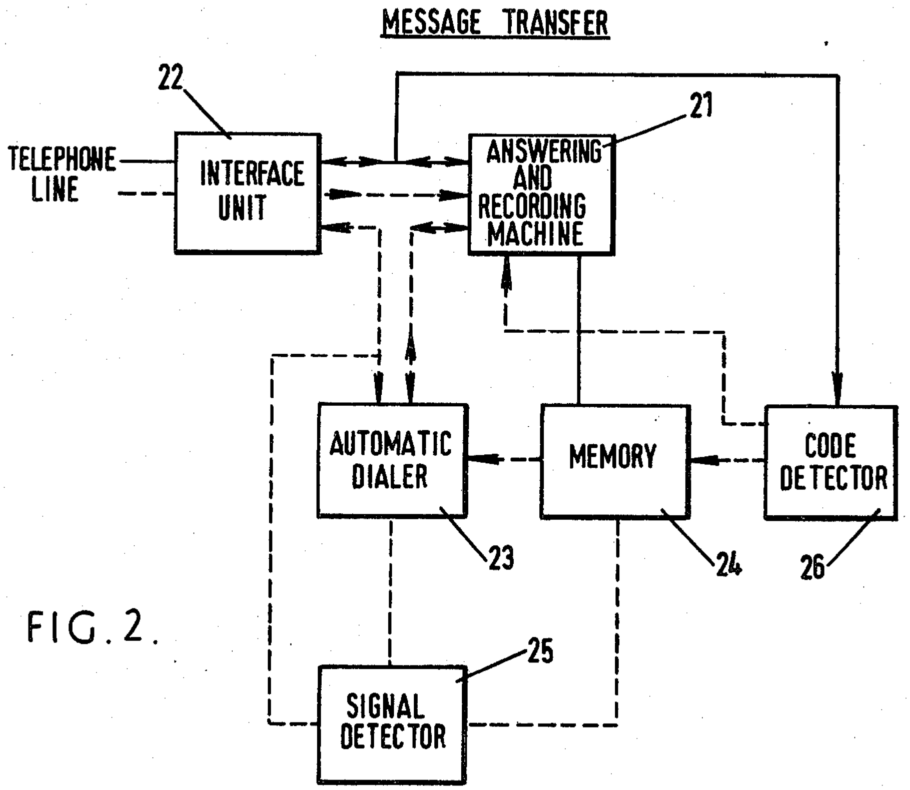
Figure 3:
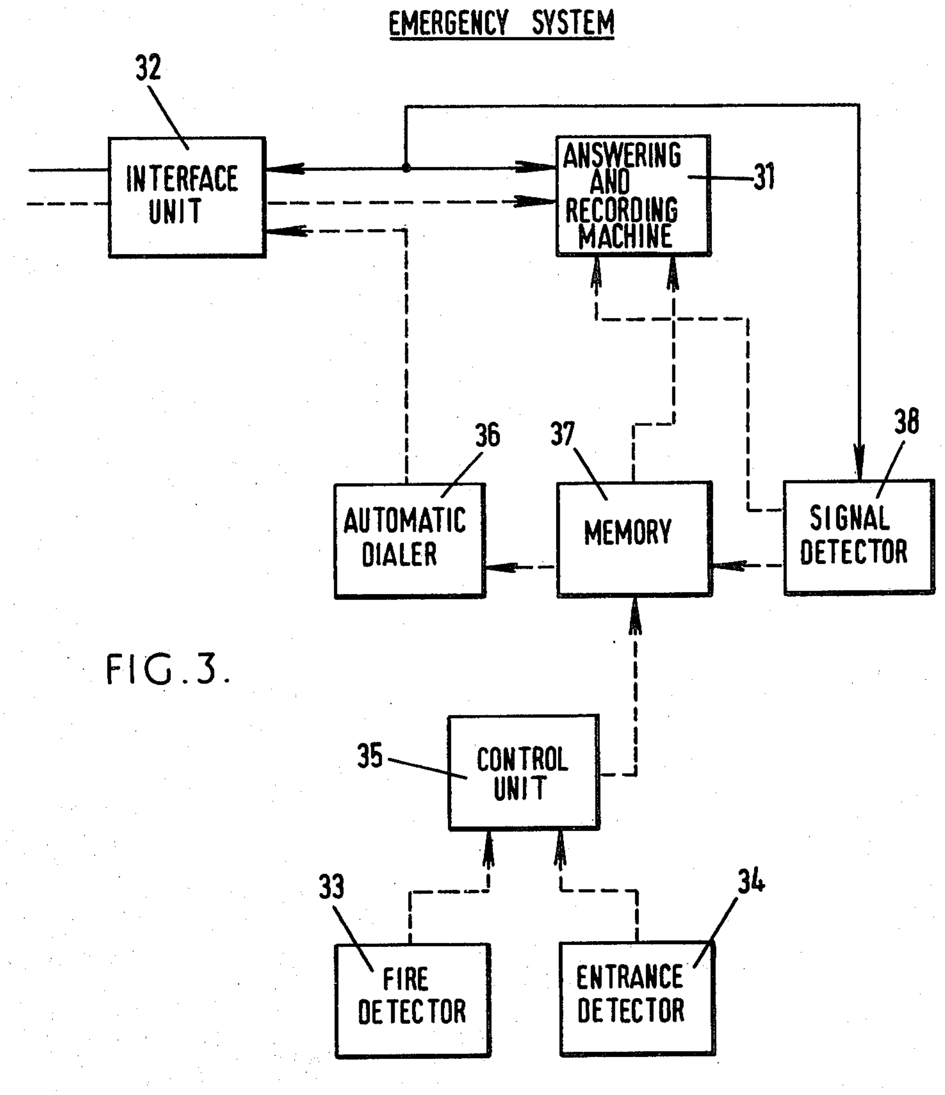

In the accompanying drawings:

FIG. 1 shows a block diagram of one form of telephone apparatus according to the present invention in which a caller may elect either to have his call diverted to another telephone number or to leave a recorded message, FIG. 2 shows a block diagram of an alternative form of telephone apparatus in which once a recorded message has been left by a caller an attempt will be made to relay that message to another telephone number, and FIG. 3 shows an additional emergency facility which may be provided in the apparatus of FIGS. 1 or 2.

In carrying the invention into effect according to one convenient mode by way of example, FIG. 1 shows telephone apparatus connected to two telephone lines 1 and 2.

An incoming call on telephone line 1 is detected by interface 11 which causes an audio switch 12 to connect line 1 to an answering and recording machine 13 and causes the machine 13 to start in an announcement mode to inform the caller that the person being called is not available but that the caller may elect either to record a message or to await an attempt to be made to direct the call to another telephone number at which the person being called may be available. This election may be made, for example, by asking the caller to speak if he wishes to record a message but to remain silent if not. At this point, the absence or presence of voice information from line 1 is detected by a choice control 14 which otherwise, in the event of voice information indicating that the caller wishes to record a message, would cause the machine 13 to operate in a message-recording mode.

However, in the absence of voice information indicating that the caller wishes this call to be diverted, the choice control 14 will cause an automatic dialer 15 to dial a telephone number, previously stored in memory 16, via an interface 17 connected to the other telephone line 2. Simultaneously, the caller is informed by a recording on machine 13 that an attempt is being made to divert the call.

When a signal detector 18 has detected on line 2 a ringing tone followed by voice signals, the detector 18 will cause machine 13 to transmit a message over line 2 asking for a person authorised to receive the directed call and inviting a coded response acceptable to code detector 19. This response, for example, may take the form of a tone or tone sequence generated mechanically or electronically by apparatus in the possession of the authorised person or by appropriate voice responses to a series of pulses or messages sent from the calling apparatus.

If the response is accepted by the code detector 19, it will cause the audio switch 12 to connect lines 1 and 2 together to permit conversation between the original called and the authorized person.

If the response is not accepted by the code detector 19, it will cause: (i) line 2 to be disconnected, (ii) machine 13 to announce to the caller that the attempt to divert the call had been unsuccessful, (with a possible invitation to leave a message, possibly to be transferred later in the manner to be described with reference to FIG. 2), and (iii) further operation of memory 16 to be inhibited until reset by the authorised person either upon his return to the apparatus or upon his calling the apparatus with an appropriately coded command. In the latter event, the authorised person may possibly use a coded command to cause any recorded messages to be replayed to him.

If desired, the apparatus described above may be simplified to the extent that the caller is not given the option of leaving a message but is simply asked to wait while an attempt is made to transfer the call.

FIG. 2 shows an alternative form of apparatus connected to a single telephone line in which an answering and recording machine 21 records in conventional manner incoming messages from the line via interface 22. However, when the line has been released by the caller, it is seized again and automatic dialler 23 dials a further telephone number stored in memory 24. The apparatus includes signal detector 25 and code detector 26 which then operates in the same manner as described in the apparatus of FIG. 1 to ensure that the recorded message is transferred only to an authorised person and that in the event of a failure of a called person to identify himself as being authorized further redialling will be inhibited until the apparatus is reset.

The systems shown in FIGS. 1 and 2 may be provided with an additional facility in the form of an emergency or alarm arrangement.

FIG. 3 shows the components necessary for this additional facility which includes an answering and recording machine 31 connected to a telephone line via interface 32 and which under normal conditions functions in conventional manner.

In the event of a fire detected by detector 33 or forcible entry of the premises detected by detector 34, a control unit 35 causes an automatic dialer 36 having memory 37 to seize the line via interface 32 and to dial an appropriate emergency number stored in memory 37. When the call has been answered as detected by signal detector 38 machine 31 is operated to transmit a pre-recorded emergency message to the emergency number.

Suitable means are provided for causing machine 31 to change from its normal answering announcement to one or more emergency messages such as for fire, burglary, flood etc. If necessary, the apparatus can be arranged so that after transmitting the emergency message, it then originates a call to a further telephone number at which the owner of the premises may be found, the apparatus requiring a coded response before delivering a suitable message.

I claim:

1. A telephone apparatus comprising:

means for receiving an incoming telephone call over a first line;

means for announcing to the caller that an attempt will be made to divert the call to another telephone number;

means for automatically dialling a predetermined telephone number;

means for initiating operation of the automatic dialling means over a second line;

means for verifying a coded response to the automatically dialled call;

means for connecting the incoming call to said predetermined number only in the event of a correctly coded response to said automatically-dialled call; and means for inhibiting further automatic dialling to said predetermined number in the absence of a correctly coded response to the automatically dialled call.

2. Apparatus as claimed in claim 1, which includes means for recording a message, and means enabling the incoming caller to elect either to record a message or to await an attempt to direct the call to another number.

3. Apparatus as claimed in claim 1, which includes means, operative in the absence of a correctly coded response to the automatically-dialled call, for informing the caller that the redirection has been unsuccessful and recording any message that he may wish to leave.

4. Apparatus as claimed in claim 1, which includes means for recording a message left as a result of the incoming telephone call, means for subsequently initiating operation of the automatic dialling means, and means for replaying the message to the predetermined number only after a correctly coded response has been received to the automatically-dialled call.

5. Apparatus as claimed in claim 1, which includes means for detecting emergency conditions and thereupon initiating operation of the automatic dialling means to call an emergency number, means being provided for replaying an emergency message to that emergency number when the call has been established.

6. Apparatus as claimed in claim 5, which includes means for subsequently initiating operation of the automatic dialling means to call a further number and to replay a message indicating that an emergency message has already been delivered, if a correctly coded response is received from the further number.

* * * * *